2,890,979

PROCAINE-2-PYRROLIDONE-5-CARBOXYLATE

John Korner, Pitman, N.J., assignor to Procosol Chemical Co., Inc. (also known as Proco-Sol Chemical Co.), Philadelphia, Pa., a corporation of Delaware No Drawing. Application January 16, 1958
Serial No. 709,189

4 Claims. (Cl. 167—52)

This invention relates to a novel organic compound which has special utility as a local anesthetic.

Procaine is the generally accepted local anesthetic for hypodermic injection and is usually employed as the water soluble hydrochloride salt in dosages of 2% to 4%. After it enters the blood stream it is oxidized in the liver within approximately fifteen minutes and then excreted through the kidneys. Its period of anesthesia is not profound or prolonged enough for surgical purposes and there is virtually no control over hemorrhage. For these reasons and to localize the action at the point of injection, procaine hydrochloride is combined with a vasoconstrictor, such as epinephrine.

Procaine hydrochloride as well as most other local anesthetics have an acid pH which is changed to a neutral pH when the anesthetic enters human tissues. It is well known that alkaline or neutral anesthetics give distinctive advantages over acidic anesthetics.

In accordance with my invention, I have produced a compound which is nearly neutral in aqueous solution, is stable in solution, gives deeper and more prolonged anesthesia than procaine hydrochloride and is less toxic than procaine hydrochloride.

This compound is procaine-2-pyrrolidone-5-carboxylate whose structural formula is:

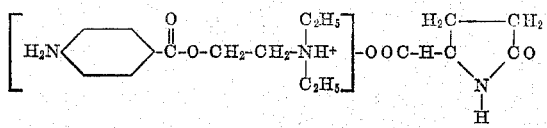

The empirical formula of the compound is

and it has the following specifications:

| | |
|---|---|
| M.W. | 365.2. |
| Nitrogen (as N) | 11.57%. |
| Procaine | 64.66%. |
| Procaine (assay based on procaine) | 97.2–99.1%. |
| Solubility in water | 2 gm./cc. |
| pH of 2% aqueous solution | 6.6–6.8. |
| Melting range | 103°–105° C. |
| Specific rotation at 20° C. (20 gm. in 100 gm. H$_2$O, 200 mm. tube) | −4.95°. |
| Loss on drying at 10 mm. and 65° C. (moisture, etc.) | 0.14%. |
| Color | White off white. |
| State | Free flowing powder hygroscopic. |

The compound is a salt of procaine (the 2-diethylaminoethyl ester of p-aminobenzoic acid) and L-pyrrolidone carboxylic acid. The L-pyrrolidone carboxylic acid is formed from the naturally occurring amino acid L-glutamic acid by refluxing the latter in distilled water up to 24 hours depending upon the pH. Adjustment of the pH to 4.2 with sodium hydroxide prior to refluxing is preferred. The glutamic acid dissolves gradually as it is converted to the pyrrolidone carboxylic acid.

After the reaction has gone to completion, the water is distilled off in vacuo. A much purer product and higher yield may be obtained by adding to the water solution an immiscible organic solvent such as ethyl ether, and shaking out whereby the pyrrolidone carboxylic acid goes into the solvent layer. This is repeated several times and then the solvent is distilled off or evaporated.

The purity of the pyrrolidone carboxylic acid depends upon the purity of the glutamic acid used. If chemically pure L-glutamic acid is used in the aforementioned procedure, the yield of the pure pyrrolidone carboxylic acid is 90 to 95% [$(\alpha)_D^{25}=11.3°$ in H$_2$O] depending upon the pH. Impure pyrrolidone carboxylic acid can be purified by decolorization with norit, filtration, evaporation of the filtrate to about ⅓ of its volume and allowing the acid to crystallize in the cold.

An illustrative but non-limitative example of a method of producing the present compound, procaine-2-pyrrolidone-5-carboxylate, is as follows. Equimolar amounts of procaine and L-pyrrolidone carboxylic acid are added to absolute acetone (approximately 500 ml.) and refluxed until the acid is dissolved and the reaction completed. The solution is then spray dried and the salt is thereby recovered. Yields are 65% to 70% of the theoretical yield. Instead of acetone other organic solvents may be used, such as ethyl ether, chloroform, carbontetrachloride, etc.

An alternative procedure is to cool the acetone solution whereupon the salt crystallizes out. The salt is removed by filtration, triturated with ethyl ether and then dried in vacuo at 100° C. Additional amounts of the salt can be recovered either by evaporation of the acetone filtrate, cooling and collecting the salt, or by the addition of ethyl ether to the acetone filtrate, filtering the salt and washing the latter with ether, followed by drying.

Extensive animal and human tests demonstrate that the compound exhibits strong local anesthetic activity. The compound was tested in 2% and 3% aqueous solutions using as a vasoconstrictor, epinephrine 1:50,000 and 1:100,000 as well as phenylephrine 1:2500. The average onset time was one to two minutes, and the average duration time of the anesthetic was one to one and one-half hours.

Toxicity tests on the compound using feeding tests and intraperitoneal injection tests showed that the compound has a lower toxicity than procaine hydrochloride not only in gram by gram comparison, but also in comparison in molecular weight ratio. The efficacy and lack of irritation of the compound was confirmed by rabbit eye, rat tail, frog nerve, guinea pig wheal, frog plexus and muscle irritation tests.

Profound anesthesia is produced by the compound because it is nearly neutral in solution.

The stability of the compound, as it is used clinically in 2% and 3% solutions, has been tested and was found to have a duration of two and one-half years without chemical change.

During its breakdown or oxidation in the human body p-aminobenzoic acid and pyroglutamic acid are formed, the former being detoxified by the liver cells and also excreted through the kidneys and the latter being excreted in the urine.

An aqueous solution containing a vasoconstrictor and 2% to 4% of the compound may be used for injection purposes. Two solutions are preferred, one a 3% aqueous solution of the compound containing epinephrine 1:50,000; the other a 3% aqueous solution of the compound containing phenylephrine 1:2500.

I claim:

1. Procaine-2-pyrrolidone-5-carboxylate.

2. A local anesthetic composition comprising as an active ingredient procaine-2-pyrrolidone-5-carboxylate.

3. The process of producing procaine-2-pyrrolidone-5-carboxylate comprised of adding equimolar amounts of procaine and L-pyrrolidone carboxylic acid to an organic solvent, refluxing until the acid dissolves and the reaction is completed, spray drying the solution and recovering the salt.

4. The process of producing procaine-2-pyrrolidone-5-carboxylate comprised of refluxing L-glutamic acid in water until it is converted to L-pyrrolidone carboxylic acid, distilling off the water in vacuo to recover the L-pyrrolidone carboxylic acid, then adding equimolar amounts of procaine and L-pyrrolidone carboxylic acid to an organic solvent, refluxing until the acid dissolves and the reaction is completed, spray drying the solution and recovering the salt.

No references cited.